(12) United States Patent
Aarni et al.

(10) Patent No.: US 8,977,717 B2
(45) Date of Patent: Mar. 10, 2015

(54) METHOD AND APPARATUS FOR PROVIDING APPLICATIONS WITH SHARED SCALABLE CACHING

(75) Inventors: Ville Aarni, Veikkola (FI); Miikka Sainio, Kerava (FI); Niklas Von Knorring, Helsinki (FI); Dmitry Kolesnikov, Vantaa (FI); Atte Lahtiranta, Bedford, MA (US)

(73) Assignee: Nokia Corporation, Espoo (FI)

( * ) Notice: Subject to any disclaimer, the term of this patent is extended or adjusted under 35 U.S.C. 154(b) by 1092 days.

(21) Appl. No.: 12/486,511

(22) Filed: Jun. 17, 2009

(65) Prior Publication Data

US 2010/0325276 A1    Dec. 23, 2010

(51) Int. Cl.
G06F 15/16    (2006.01)
G06F 9/54    (2006.01)

(52) U.S. Cl.
CPC ............ *G06F 9/54* (2013.01); *G06F 2209/541* (2013.01)
USPC ............................. 709/219; 709/214; 709/225

(58) Field of Classification Search
CPC ..................... G06F 17/30943; H04L 67/2823; H04L 67/2842
USPC .......... 709/213, 214, 217, 219, 223, 224, 225
See application file for complete search history.

(56) References Cited

U.S. PATENT DOCUMENTS

| | | | |
|---|---|---|---|
| 6,073,129 A | 6/2000 | Levine et al. | |
| 7,054,923 B2 * | 5/2006 | Krishnamoorthy | 709/219 |
| 7,636,792 B1 * | 12/2009 | Ho | 709/246 |
| 7,680,483 B2 * | 3/2010 | Kim | 455/406 |
| 7,970,418 B2 * | 6/2011 | Schmidt et al. | 455/456.5 |
| 8,086,677 B2 * | 12/2011 | Murphy | 709/206 |
| 8,224,878 B2 * | 7/2012 | Moon | 707/822 |
| 2006/0143622 A1 * | 6/2006 | Prabandham et al. | 719/328 |
| 2007/0073791 A1 | 3/2007 | Bruce et al. | |
| 2008/0039210 A1 | 2/2008 | Junkin et al. | |
| 2008/0123855 A1 | 5/2008 | Thomas | |
| 2008/0263052 A1 | 10/2008 | Parsell et al. | |
| 2009/0080408 A1 | 3/2009 | Natoli et al. | |
| 2009/0199108 A1 | 8/2009 | Bannister et al. | |
| 2009/0319374 A1 * | 12/2009 | Rybak et al. | 705/14.58 |

FOREIGN PATENT DOCUMENTS

| | | |
|---|---|---|
| IE | 20000424 A2 | 2/2001 |
| JP | 2001-202450 A | 7/2001 |

* cited by examiner

*Primary Examiner* — Viet Vu
(74) *Attorney, Agent, or Firm* — Alston & Bird LLP

(57) ABSTRACT

An approach is provided for initiating sending a request message indicating a parameter for an application to an index of parameter values stored in a database for a plurality of related applications. A value for the parameter is received in response to sending the request. Performing a function of the application based on the value received for the parameter is initiated. The value for the parameter is used by a different mobile application of the plurality of related applications.

10 Claims, 9 Drawing Sheets

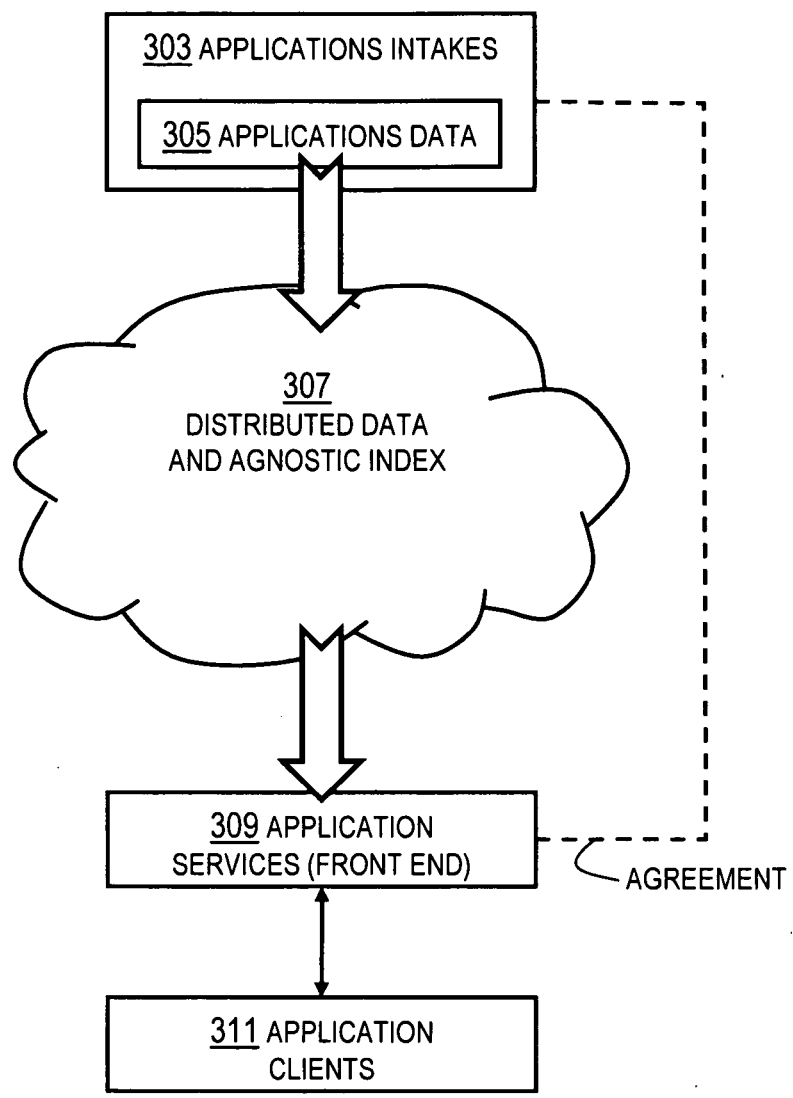

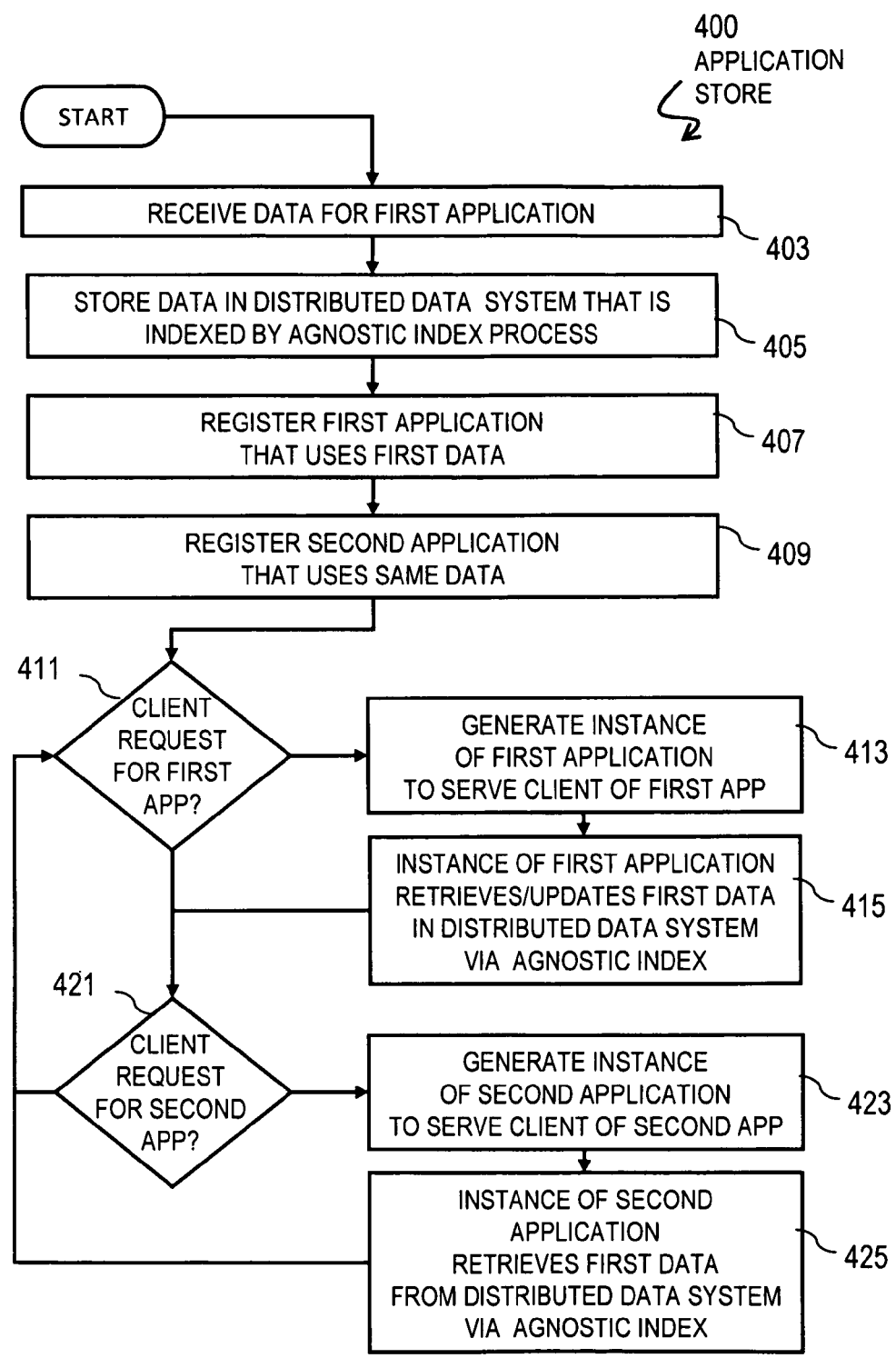

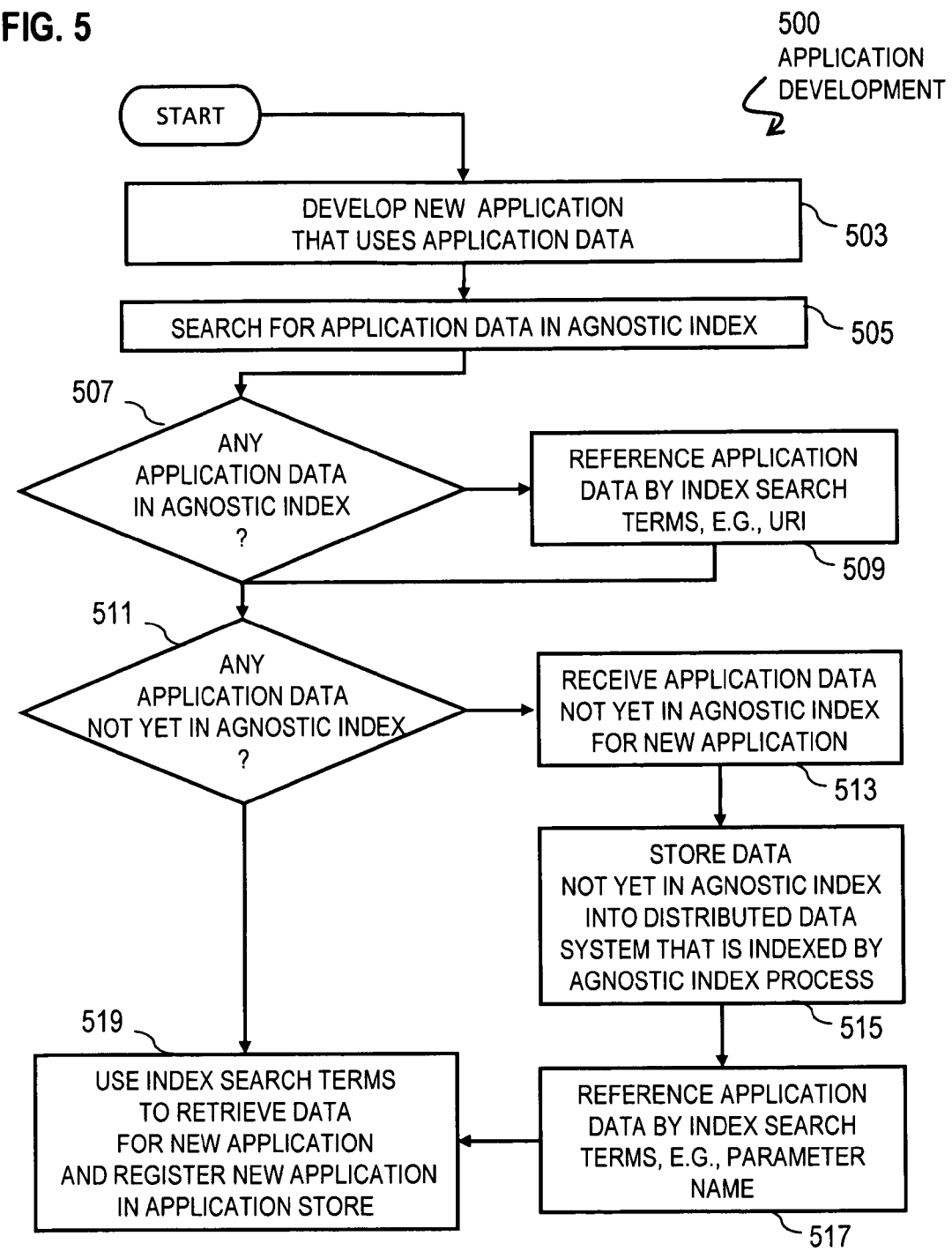

METHOD AND APPARATUS FOR PROVIDING APPLICATIONS WITH SHARED SCALABLE CACHING

BACKGROUND

Service providers and device manufacturers are continually challenged to deliver value and convenience to consumers by, for example, providing compelling network services and stand alone processes, collectively called herein mobile applications. Each mobile application generates and caches data for use by the application, such as metadata about content rendered by the application. Many related applications cache similar data, but each is independently responsible for creating its own storage and caching layers on the network. This leads to redundant and wasteful development efforts as well as redundant operations and storage on a mobile device executing several of the related applications. The redundant processor instructions and data storage are an extra burden on mobile devices, which are subject to bandwidth, processing and storage limitations.

SOME EXAMPLE EMBODIMENTS

Therefore, there is a need for an approach for shared scalable caching of applications.

According to one embodiment, a method comprises initiating sending a request message indicating a parameter for an application to an index of parameter values stored in a database for a plurality of related applications. The method also comprises receiving a value for the parameter in response to sending the request. The method further comprises initiating performing a function of the application based on the value received for the parameter, wherein the value for the parameter is used by a different application of the plurality of related applications.

According to another embodiment, an apparatus comprising at least one processor, and at least one memory including computer program code, the at least one memory and the computer program code configured to, with the at least one processor, cause the apparatus to initiate sending a request message indicating a parameter for an application to an index of parameter values stored in a database for a plurality of related applications. The apparatus is also caused to receive a value for the parameter in response to sending the request. The apparatus is further caused to initiate performing a function of the application based on the value received for the parameter, wherein the value for the parameter is used by a different application of the plurality of related applications.

According to another embodiment, a computer-readable storage medium carrying one or more sequences of one or more instructions which, when executed by one or more processors, cause an apparatus to initiate sending a request message indicating a parameter for an application to an index of parameter values stored in a database for a plurality of related applications. The apparatus is also caused to receive a value for the parameter in response to sending the request. The apparatus is further caused to initiate performing a function of the application based on the value received for the parameter, wherein the value for the parameter is used by a different application of the plurality of related applications.

According to another embodiment, an apparatus comprises means for initiating sending a request message indicating a parameter for an application to an index of parameter values stored in a database for a plurality of related applications. The apparatus also comprises means for receiving a value for the parameter in response to sending the request. The apparatus further comprises means for initiating performing a function of the application based on the value received for the parameter, wherein the value for the parameter is used by a different application of the plurality of related applications.

According to another embodiment, a method comprises granting access to receive a request message indicating a parameter for an application to an index of parameter values stored in a database for a plurality of related applications. The method also comprises in response to receiving the query, transmitting a value for the parameter. A function of the application is performed based on the value transmitted for the parameter. The value for the parameter is used by a different application of the plurality of related applications.

According to another embodiment, an apparatus comprising at least one processor, and at least one memory including computer program code, the at least one memory and the computer program code configured to, with the at least one processor, cause the apparatus to grant access to receive a request message indicating a parameter for an application to an index of parameter values stored in a database for a plurality of related applications. The apparatus is further caused to, in response to receiving the query, transmit a value for the parameter. A function of the application is performed based on the value transmitted for the parameter. The value for the parameter is used by a different application of the plurality of related applications.

According to another embodiment, an apparatus comprises means for granting access to receive a request message indicating a parameter for an application to an index of parameter values stored in a database for a plurality of related applications. The apparatus further comprises means for transmitting, in response to receiving the query, a value for the parameter. A function of the application is performed based on the value transmitted for the parameter. The value for the parameter is used by a different application of the plurality of related applications.

According to yet another embodiment, a computer-readable storage medium carrying one or more sequences of one or more instructions which, when executed by one or more processors, cause an apparatus to grant access to receive a request message indicating a parameter for an application to an index of parameter values stored in a database for a plurality of related applications. The apparatus is further caused to, in response to receiving the query, transmit a value for the parameter. A function of the application is performed based on the value transmitted for the parameter. The value for the parameter is used by a different application of the plurality of related applications.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a diagram of application data flow from one application to a different application, according to an embodiment;

FIG. 4 is a flowchart of a process for shared scalable caching of mobile application data for multiple mobile applications, according to one embodiment;

FIG. 5 is a flowchart of a process for shared scalable caching of mobile application data, according to one embodiment;

DETAILED DESCRIPTION OF EXAMPLE EMBODIMENTS

A method and apparatus for shared scalable caching of mobile application data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
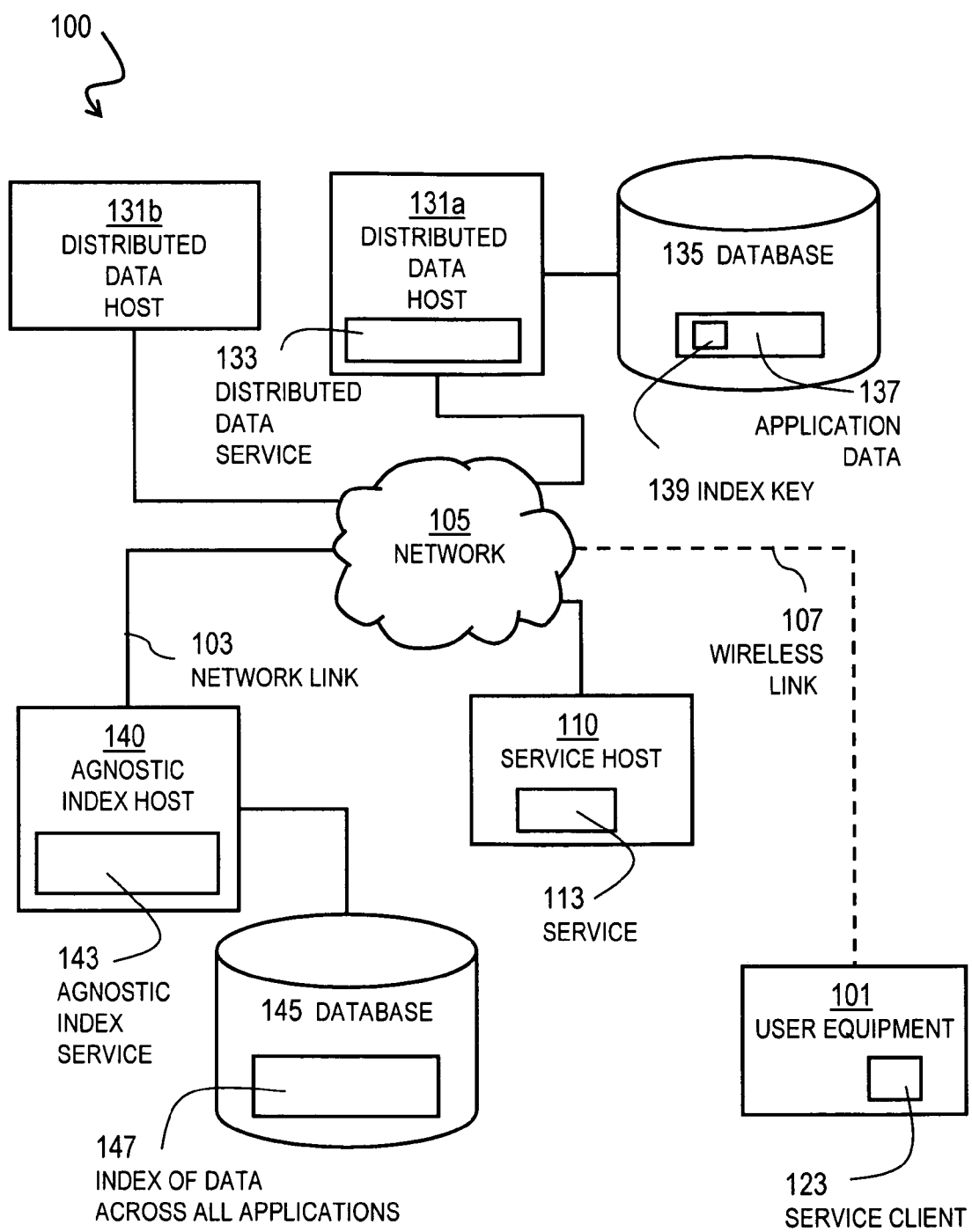
FIG. 1 is a diagram of a system capable of shared scalable caching of mobile application data, according to one embodiment.

FIG. 1 is a diagram of a system 100 capable of shared scalable caching of mobile application data, according to one embodiment. It is noted that traditionally each application developed for a mobile device independently handles storage and caching layers for application data. If two or more applications are designed to exchange information, then messaging protocols, parameter definitions, and tracking of two-way communications are involved to implement the sharing of information. As the number of applications to share information increases, or the number of instances of those applications rise, a full network of interactions is tracked—leading to an overhead burden that might overwhelm the processing power and bandwidth available on a mobile device of limited resources. When overhead demand dominates resource utilization as the number of interacting applications increases, the process is said to not scale well. A process scales well when node resources are not dominated by overhead as the number of interacting nodes increases.

To address this problem, a system 100 of FIG. 1 introduces, in certain embodiments, the capability to use a distributed database that does not need to conform to a particular schema for organizing data (i.e., schema-free caching) with an index that does not care how an application generates or uses the data (i.e., an agnostic index). Thus, FIG. 1 shows a system for caching shared information among mobile applications on mobile devices, which scales well, i.e., is scalable. As used herein, the term application refers to any process running on user or service provider equipment, including stand alone processes, client processes communicating with a server process hosted somewhere on a network, and the server processes.

Although various embodiments are described with respect to a shared pop quiz application, it is contemplated that the approach described herein may be used with other applications, such as shared metadata about available content, shared location information, shared information about mobile device capabilities, and user profiles shared in a social network, among others, for mobile applications designed for mobile devices or applications that may or may not be designed for mobile devices.

As used herein, the terms content or media refer to any digital data that can be presented for human perception, for example, digital sound, songs, digital images, digital games, digital maps, point of interest information, digital videos (such as music videos, news clips and theatrical videos), advertisements, program files or objects, any other digital media or content, or any combination thereof. The term rendering indicates any method for presenting the content to a human user, including playing music through speakers, displaying images on a screen or in a projection or on tangible media such as photographic or plain paper, showing videos on a suitable display device with sound, graphing game or map data, music or video playback or streaming, games playing, image or map displaying, radio or television content broadcasting or streaming, or any other term of art for presentation, or any combination thereof.

As shown in FIG. 1, the system 100 comprises a user equipment (UE) 101 with service client 123 having connectivity to a service 113 on service host 110 via a communication network 105. Likewise the client 123 and service 113 have connectivity to an agnostic index service 143 on one or more agnostic index hosts 140 and a distributed data service 133 on multiple hosts (e.g., distributed data host 131a, distributed data host 131b, and others, not shown, collectively referenced hereinafter as distributed data hosts 131) via the communication network 105.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). In the illustrated embodiment, the UE 101 is a mobile terminal, as described below with reference to FIG. 9, connected to network 105 via wireless link 107.

By way of example, the UE 101, host 110, hosts 140, and hosts 131 communicate with each other and other components of the communication network 105 using well known, standard or proprietary protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages.

In the illustrate embodiment, the service 113 saves mobile application data in the distributed data service (DDS) system executing on multiple hosts 131. Each host stores data for one or more applications or instances thereof in application data structures 137 on a local database 135 or a database connected to a different host 131. Each application data structure 137 is associated with a DDS key 139 for locating the data structure 137 on any database 135 connected to any host 131 of the DDS system. The data stored in application data structure 137, such as one or more data fields in one or more files or in one or more tables of a relational database or some combination thereof, can be stored in any order, with or without self description. Thus the DDS system is schema free.

The data fields and values in the application data structures in the databases 135 for all distributed data hosts 131 are indexed in index 147 in database 145 by the agnostic index service 143 on agnostic index host 140. The index 147 holds data that indicates for each parameter in the DDS, a DDS key and the parameter names or names and values for one or more parameters of the application data 137. In some embodiments, the index 147 includes a range of values for the parameter in that application, to distinguish different applications using the same parameter in different ranges, e.g., applications with metadata for different content, e.g., music from different ranges of release dates or countries. The agnostic index service does not need to know or care how an application generates or uses the named parameters and values, it merely indexes those names and values, and is thus said to be application agnostic. In some embodiments, one or the parameters for an application is an network-wide unique application name, such as the application's uniform resource identifier (URI).

Thus a generic DDS 133 and agnostic index service 143 is able to store application data for any application, including any mobile applications, such as for service 13 and client 123, or a stand alone process (not shown) on UE 101. As described in more detail below, this allows mobile applications to cache shared data in a process that is scalable.

Although a particular set of nodes, processes, and data structures, such as databases, are shown in FIG. 1 for purposes of illustration, in various other embodiments more or fewer nodes, processes and data structures are involved. Furthermore, although processes and data structures are depicted as particular blocks in a particular arrangement for purposes of illustration, in other embodiments each process or data structure, or portions thereof, may be separated or combined or arranged in some other fashion. For example, in some embodiments, instead of client 123, UE 101 includes a standalone process (not shown) that communicates directly with the agnostic index service 143 and DDS 133.

Figure 2A:
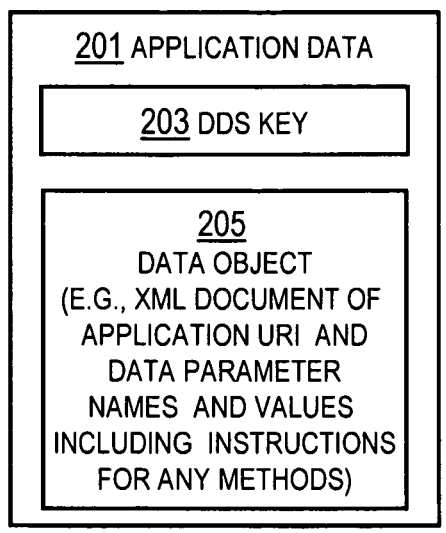
FIG. 2A is a diagram of the components of a distributed, schema-free database for application data, according to one embodiment.

FIG. 2A is a diagram of the components of a distributed, schema-free database for application data, according to one embodiment. The component is one application data structure 201, such as application data structure 137 depicted in FIG. 1. The application data structure 201 includes a DDS key field 203 and a data object 205 produced by a particular application. In some embodiments, the DDS field is an explicit field with a DDS key value, such as a file name or URI. In some embodiments, the DDS Key is a numeric reference to a row in a table, e.g., in a relational database) and is not an explicit field in the table.

In the illustrated embodiment, the data object 205 is an extended markup language (XML) document that holds data that indicates the parameters and values for an application. For example, one parameter is the URI to uniquely identify the application on a network (e.g., network 105). As is well known in the art, an XML document lists one or more nested or un-nested parameters and corresponding values within each pair of opening and closing tags. Thus XML documents provide self labeled parameters and parameter values. In some embodiments, a parameter name is a method name and the value is a set of instructions in a programming language. The parameter names and values can be provided in any order in the data object 205, thus the application data structure 201 of the DDS is schema-free. The DDS merely needs to track which host 131 is connected to a database 135 that holds a data structure 137 associated with the DDS key indicated in field 203, and which data structure 137 in the database 135 is associated with the DDS key.

Because the application data structures are distributed among multiple hosts connected to network 105, the capacity and bandwidth of the DDS is effectively unlimited, and scales well. The DDS key is designed to be resolved efficiently without searching every host 131 of the DDS, using any method known in the art at the time an embodiment is implemented.

Figure 2B:
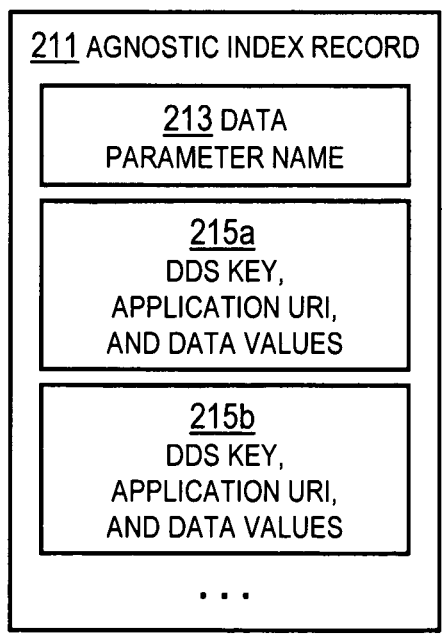
FIG. 2B is a diagram of the components of index for mobile application data in the distributed, according to one embodiment.

FIG. 2B is a diagram of the components of an index for mobile application data in the distributed database, according to one embodiment. The illustrated component is a record 211 of the agnostic index. The agnostic index is assembled by examining the application data structures 137 of the DDS. Each agnostic index record 211 includes a parameter name field 213 and one or more application fields, such as fields 215a, 215b and additional fields indicated by ellipsis, collectively referenced herein as application fields 215. Each application field 215 holds data that indicates the URI of an application, the DDS key for the application data and data values in that application for the parameter name indicated in field 213. Only applications that include the parameter name in their application data structures 137 are included in the agnostic index record for a particular parameter name. The index 147 can be searched for index records 211 based on the values of the application URI or other parameters, or some combination thereof. A result of the search is a DDS key that can be used to retrieve the application data object in the DDS for one or more applications. The index is agnostic because the index does not know or care how the parameter is used or values generated by the application. In some embodiments, the index record includes just the DDS key for a given parameter name, or just the DDS key and application URI for a given parameter name.

FIG. 3 is a diagram of application data flow from one application to a different application, according to an embodiment. Process 303 is a data intake process for each of one or more applications. The intake process 303 collects application data 305. For example, the content store quiz application 303 takes in questions and answers 305 about multiple contents available at the content store.

Instead of caching that information locally, the application intake processes cache that data in the DDS which determines which DDS host 131, database 135 and database record to store the data in, and determines the corresponding DDS key. The application data in the DDS is indexed by the agnostic index service 143, e.g., by monitoring database events on each DDS host 131. The combined DDS and agnostic index components are represented by DDS and index network cloud 307.

Later, when the applications front ends 309 are run, e.g., in response to requests from application clients 311, as shown, or in response to instantiation of a standalone application on UE 101 or other host, data is retrieved from the DDS and index network cloud 307. Based on a search of the index, any of the applications' front ends 309 can retrieve information stored by any of the intakes 303 of those applications. If the data is to be used properly by the application front end 309 then that front end 309 should be aware of the data parameters and uses as defined by the applications intake 303, as indicated by the dashed line labeled "agreement." However, there is no need for the DDS and agnostic index in network cloud 307 to be aware of the meanings of the parameter names and values. Thus a generic cloud 307 is used to share data among two or more instances of one or more applications without establishing two-way communications between each instance of the one or more applications, or otherwise integrating them.

As depicted in FIG. 3, the index in network cloud 307 is a massively scalable caching cloud which offers caching and searches for applications. The DDS is a massively scalable, schema-free application data storage, which allows applications to have their data persist in any format chosen by the application. The DDS and agnostic index are integrated, because the agnostic index is formed by monitoring the DDS. The arrangement depicted in FIG. 3 allows different applications, such as different mobile applications, to re-use major parts of a service backbone instead of creating their own storage and caching layers. Furthermore, the depicted arrangement enables applications to share cached data via the agnostic index, instead of in direct communications with each other, thus reducing the number of direct integrations needed between applications. This is especially helpful in mobile applications, for both stand alone and client processes, which have limited resources and network bandwidth and availability.

In one example embodiment, a social network content store service receives a music quiz application via the intake portion of the content store service; and stores that quiz as a data object with parameters, values and methods in the DDS. The social network content store front end, responds to requests from clients (e.g., browsers) by rendering the quiz application for the client process (e.g., in a Web page). A different service, e.g., a social music service, wants to offer the same quiz application for the subscribers of the social music service. Instead of integrating with the content store service, the social music service searches the agnostic index for the music quiz application (e.g., by the metadata values for the application or by the URI of the application), obtains the DDS key of the corresponding data object, and retrieves the music quiz application object from the corresponding data structure of the DDS. The social music service front end responds to requests from clients (e.g., browsers) by rendering the quiz application for the client process (e.g., in a Web page). The content store intake process and the social music front end agree on the data model in the quiz application data object; however, the agnostic index and DDS are unaware and unconcerned about that data model in the quiz application data object.

Figure 8:
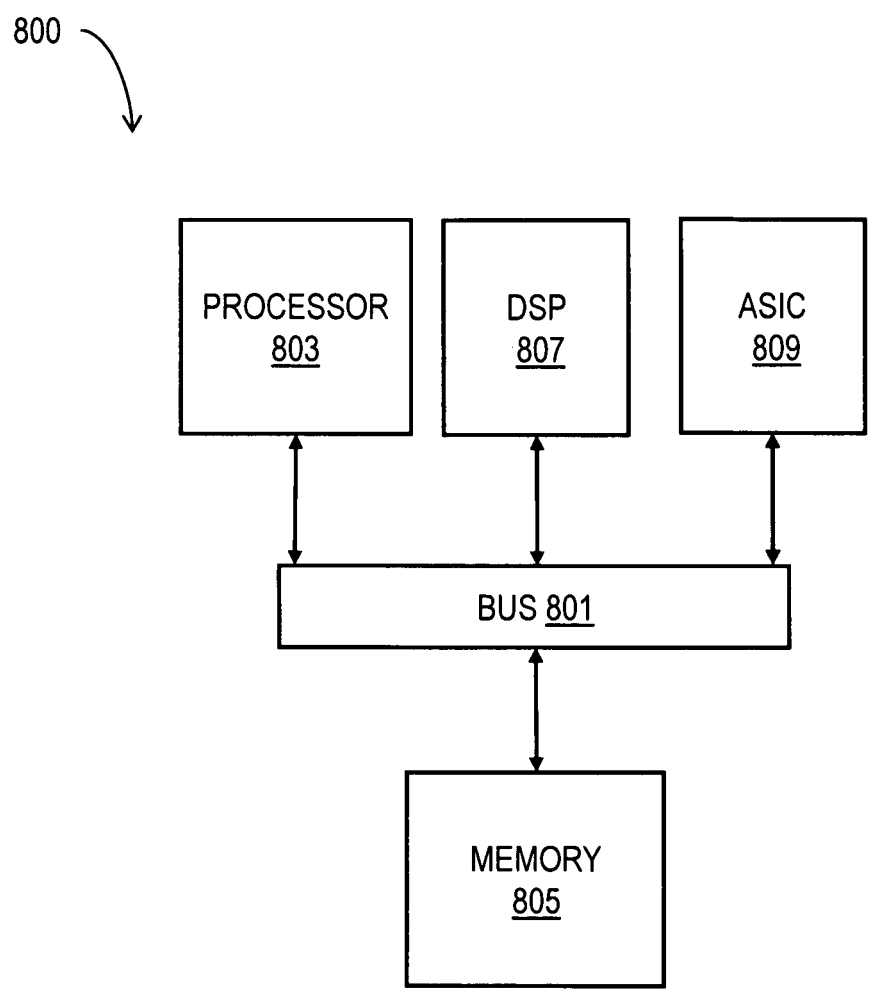
FIG. 8 is a diagram of a chip set that can be used to implement an embodiment of the invention.

FIG. 4 is a flowchart of a process 401 for shared scalable caching of mobile application data for multiple mobile applications, according to one embodiment. In one embodiment, an application store service (e.g., service 113) performs the process 401 and is implemented in, for instance, a chip set including a processor and a memory as shown in FIG. 8.

Although steps in FIG. 4 and subsequent flow chart FIG. 5 are shown in a particular order for purposes of illustration, in other embodiments, one or more steps may be performed in a different order or overlapping in time, in series or in parallel, or one or more steps may be omitted or added, or changed in some combination of ways.

In step 403, data is received for a first application, e.g., quiz application data is received for a content store application. Any method may be used to receive this data. For example, in various embodiments, the data is included as a default value in software instructions, is received as manual input from an administrator on the local or a remote node, is retrieved from a local file or database, or is sent from a different node on the network, either in response to a query or unsolicited, or the data is received using some combination of these methods.

In step 405, the data is stored in a distributed data service (DDS) system (e.g., DDS 133) that is indexed by an agnostic index process (e.g., agnostic index service 143). For example, a URI for the quiz application is stored in the DDS, along with questions and answers for the quiz, instructions for methods to render the questions and prompt for and evaluate the answers from a user, and metadata about the quiz application, such as the author of the quiz, the date the quiz was generated, and the size of the data object. Automatically, without further action by the application store, in response to step 405, the agnostic index indexes the data added to the DDS. For example, the index associates the DDS key with each parameter name used in the data object and, in some embodiments, associates one or more values for the parameter with the DDS key, such as the URI of the quiz application.

In step 407, the first application is registered with the application store. For example, in step 407, the content store application is registered with the application store process 401, and appears in a pull down menu of applications available at the application store.

In step 409 a second, different application that uses the same data is also registered with the application store process 401. For example, a social music application is registered with the application store in step 409 and appears in a pull down menu of applications available at the application store.

In step 411, it is determined whether a client request is received for the first application, e.g., a request for a content store service. If so, then in step 413 an instance of the first application is generated to serve the client, e.g., an instance of the content store is generated to serve a content store client. If not, then control passes to step 421, described below.

In step 415, the instance of the first application retrieves or updates the first data in the DDS via the agnostic index. For example, in response to the client requesting the quiz, the content store retrieves the quiz application from the DDS through the index. For example, the content store application requests the quiz data object from the index by specifying the URI for the quiz application. In some embodiments, the content store application requests the quiz data object by specifying values for other metadata, e.g., the name of the application (e.g., name="content quiz") and a date (date>2009/01/01). In response, the index returns the DDS keys for all application data that matches the search criteria, e.g., the specified URI. It is assumed for purposes of illustration, that only one DDS key is returned for the quiz application URI. In this embodiment, during step 415, the content store retrieves the quiz application data object and renders it in a webpage, complete with the instructions to prompt for and evaluate user responses.

In step 421, it is determined whether a client request is received for the second application, e.g., a request for a social music service. If so, then in step 423 an instance of the second application is generated to serve the client, e.g., an instance of the social music service is generated to serve a social music client. If not, then control passes back to step 411, described above, until the applications store process 401 ends.

In step 425, the instance of the second application retrieves the first data in the DDS via the agnostic index. For example, in response to the social music client requesting the quiz, the social music service retrieves the quiz application from the DDS through the index. For example, the social music service requests the quiz data object from the index by specifying the value of the URI or other metadata for the quiz application. In response, the index returns the DDS keys for all application data that matches the search criteria. It is assumed for purposes of illustration, that only one DDS key is returned for the specified URI of the quiz application. In this embodiment, during step 425, the social music service retrieves the quiz application data object and renders it in a webpage, complete with the instructions to prompt for and evaluate user responses.

Thus both the content store and the social music service use the same quiz application object, without establishing communication between the content store and the social music services and without integrating the content store and the social music services.

FIG. 5 is a flowchart of a process 500 for shared scalable caching of mobile application data, according to one embodiment. Process 500 is followed while a second application is being developed, e.g., during development of the social music application.

In step 503, a new application is developed that uses application data, e.g., a social music application is developed that signs up users and establishes relationships among users and provides a quiz. The application data for the social music service includes user profile metadata parameters and music content metadata parameters and a quiz application developed for the content store application.

In step 505, a search is made for some or all of the application data using the agnostic index.

In step 507, it is determined whether any of the application data is in the agnostic index, e.g., by sending a request for application data associated with values for one or more parameters to the agnostic index service 143, and determining whether a non-null DDS key is returned. For example, it is determined that the URI of the quiz application object returns a non-null DDS key value, and therefore is available in the agnostic index. In step 509, application data is referenced by an agnostic index search term, e.g., a quiz parameter name or quiz application URI.

In step 511, it is determined whether any application data is not yet in the agnostic index. For example, it is determined whether a null value was returned for the DDS key for any application data. For purposes of illustration, it is assumed that null values are returned for certain metadata describing music content. If so, then in step 513, the application data not yet in the agnostic index for the new application is received form some other source, e.g., from the developer. For example, the parameters and values describing certain music content is received from a developer of the social music service in step 513.

In step 515, the new application data received in step 513 is stored in the DDS, and subsequently indexed automatically by the agnostic index. For example, the metadata parameters and values of the certain music content are stored as application data in the DDS.

In step 517, newly stored application data is referenced by an agnostic index search term, e.g., parameter name or application URI or a certain value or range of values for a parameter of the application.

In step 519, the application data is referenced by an agnostic index search term in instructions to cause a processor to perform the steps of the new application. For example, the social music application obtains the quiz to present to a subscriber by searching the agnostic index for the URI of the quiz application. Step 519 includes registering the new application in an application store, if any.

Figure 6:
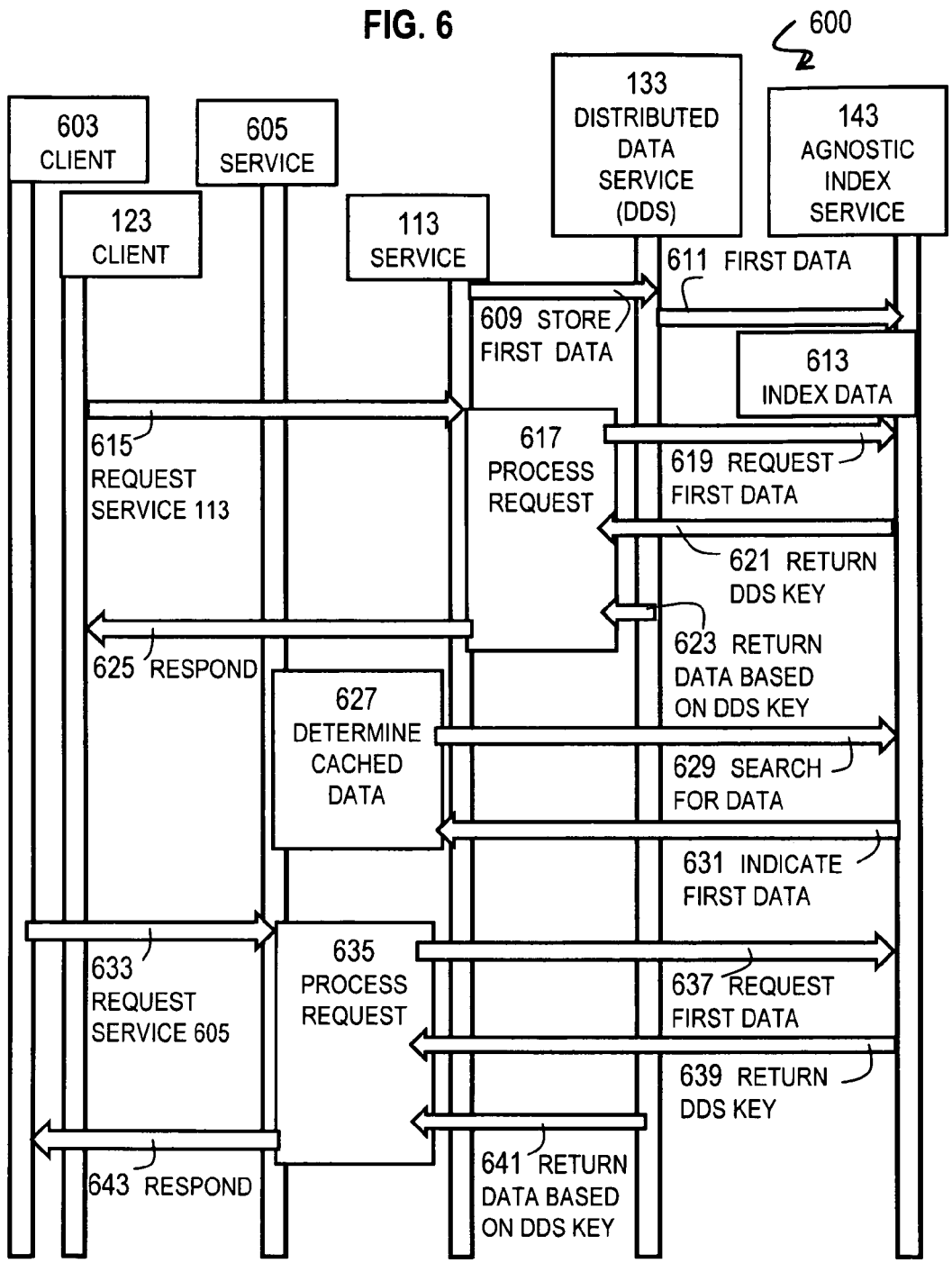
FIG. 6 is a time sequence diagram that illustrates a sequence of messages and processes for sharing scalable cached data for multiple mobile applications, according to an embodiment.

FIG. 6 is a time sequence diagram that illustrates a sequence of messages and processes 600 for sharing scalable cached data for multiple mobile applications, according to an embodiment. Time increases downward in this diagram. A network process on the network is represented by a thin vertical box. A message passed from one process to another is represented by horizontal arrows. A step performed by a process is indicated by a box or looping arrow overlapping the process at a time sequence indicated by the vertical position of the box or looping arrow.

The processes represented in FIG. 6 are the first service client 123 on mobile terminal 120 and first service 113, as well a s second service client 603 and second service 605, in communication with the distributed data service (DDS) 133 and agnostic index service 143.

Service 113 stores first application data in a message 609 to DDS 133. For example, the parameters and values of the quiz, including instructions for one or more methods, are stored in the DDS by a content store service. In message 611, the agnostic index service receives the parameters and values of the first data, e.g., as a result of searching the DDS. In process 613, the DDS data is indexed, and, for example, the DDS key is associated with one or more parameters and values of the first application data. For example, the index service retrieves an XML document for a DDS key, and sorts the parameter names and values found therein. Subsequent requests to the index service 143 for data based on parameter names or values can be resolved by the index service to return the DDS key, or, in some embodiments, the data object itself from the DDS.

Client 123 eventually submits one or more request messages 615 to the service 113. In process 617 the service instantiates a service thread to respond to the request. The process 617 sends one or more messages 619 to the index to request the first data based on one or more parameter names or values, e.g., requests the quiz application data object based on the URI name of the quiz application. One or more messages 621 return the DDS key or keys that satisfy the request. The data is retrieved from the DDS in one or more messages 623 based on the DDS key, for example, in response to a request for the application data object from the process 617. In some embodiments, the index service 143 sends the DDS key and network address of the service instance to the DDS, which returns the data object to the service instance without further action by the process 617. The process 617, e.g., an instance of the service 113, eventually sends one or more response messages 625 to the client 123 based on the first data.

During development or instantiation of a second service 605, process 627 determines what application data is already cached in the DDS. In some embodiments, second service 605 is merely a different instance of the same service 113. In an illustrated example, the second service 605 is a different service, e.g., a social music service. The process 627 includes sending one or more messages to the index service 143 to search for certain data, e.g., for the quiz application object, as indicated by the URI of the quiz application object or the application name "music quiz" and date "after 2009/01/01." In message 631, the DDS key that satisfies the request is returned, indicating the requested data is stored on the DDS. In some embodiments, the DDS key is used in the service 605 to reference the data. In some embodiments, the service 605 merely uses the DDS key to indicate that the search has a positive result, but continues to reference the data object by the search terms (e.g., URI, or application name and date). Data for application 605 which are not already in the DDS are obtained by another process and stored in DDS, in a manner analogous to that shown for the first data in messages 609.

Client 603 eventually submits one or more request messages 633 to the service 605. For example, a social music client requests the quiz. In process 635 the service 605 instantiates a service to respond to the request. The process 635 sends one or more messages 637 to the index to request the first data used in the other service 113 based on one or more parameter names or values, e.g., requests the quiz application data object based on the URI name of the quiz application. One or more messages 639 return the DDS key or keys that satisfy the request. The data is retrieved from the DDS in one or more messages 641 based on the DDS key, for example, in response to a request for the application data object from the process 635. In some embodiments, the index service 143 sends the DDS key and network address of the service instance to the DDS, which returns the data object to the service instance 605 directly, without further action by the process 635. The process 635, e.g., an instance of the service 605, eventually sends one or more response messages 643 to the client 603.

Thus both the content store service 113 and the social music service 605 use the same quiz application object, without establishing communication between the content store service 113 and the social music service 605 and without integrating the content store service 113 and the social music service 605.

The processes and arrangement, as explained, advantageously provide, in certain embodiments, a scalable approach for sharing information among mobile applications within corresponding mobile devices. As such, mobile devices can more efficient manage sharing of information, thereby reducing processing requirements. Moreover, bandwidth is conserved by eliminating overhead.

The processes described herein for providing shared scalable caching of mobile application data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
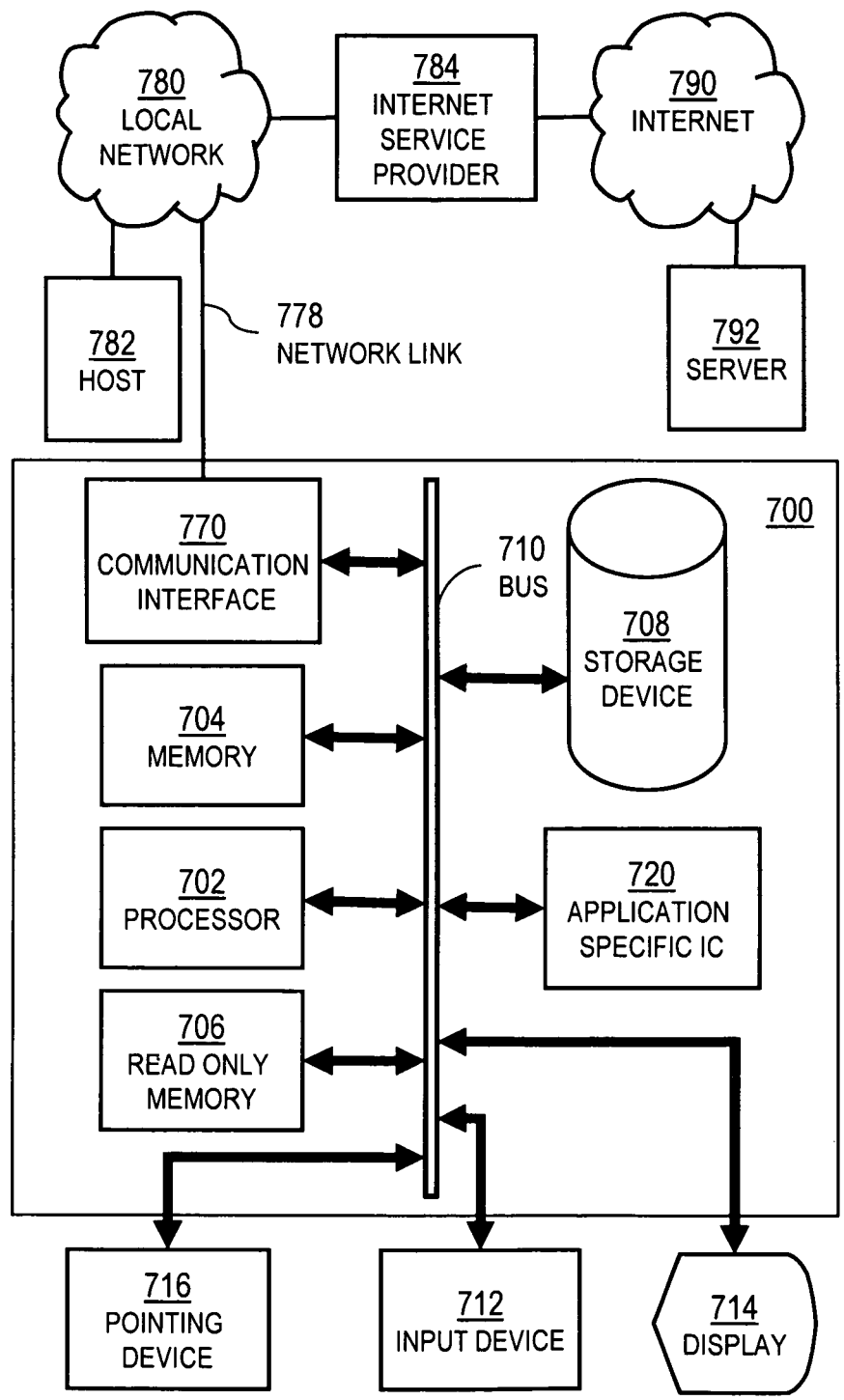
FIG. 7 is a diagram of hardware that can be used to implement an embodiment of the invention.

FIG. 7 illustrates a computer system 700 upon which an embodiment of the invention may be implemented. Computer system 700 is programmed (e.g., via computer program code or instructions) to shared scalable caching of mobile application data as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to shared scalable caching of mobile application data The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for shared scalable caching of mobile application data. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for shared scalable caching of mobile application data, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for shared scalable caching of mobile application data to the UE 101.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 8 illustrates a chip set 800 upon which an embodiment of the invention may be implemented. Chip set 800 is programmed to shared scalable caching of mobile application data as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805.

The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein for shared scalable caching of mobile application data. The memory 805 also stores the data associated with or generated by the execution of the inventive steps.

Figure 9:
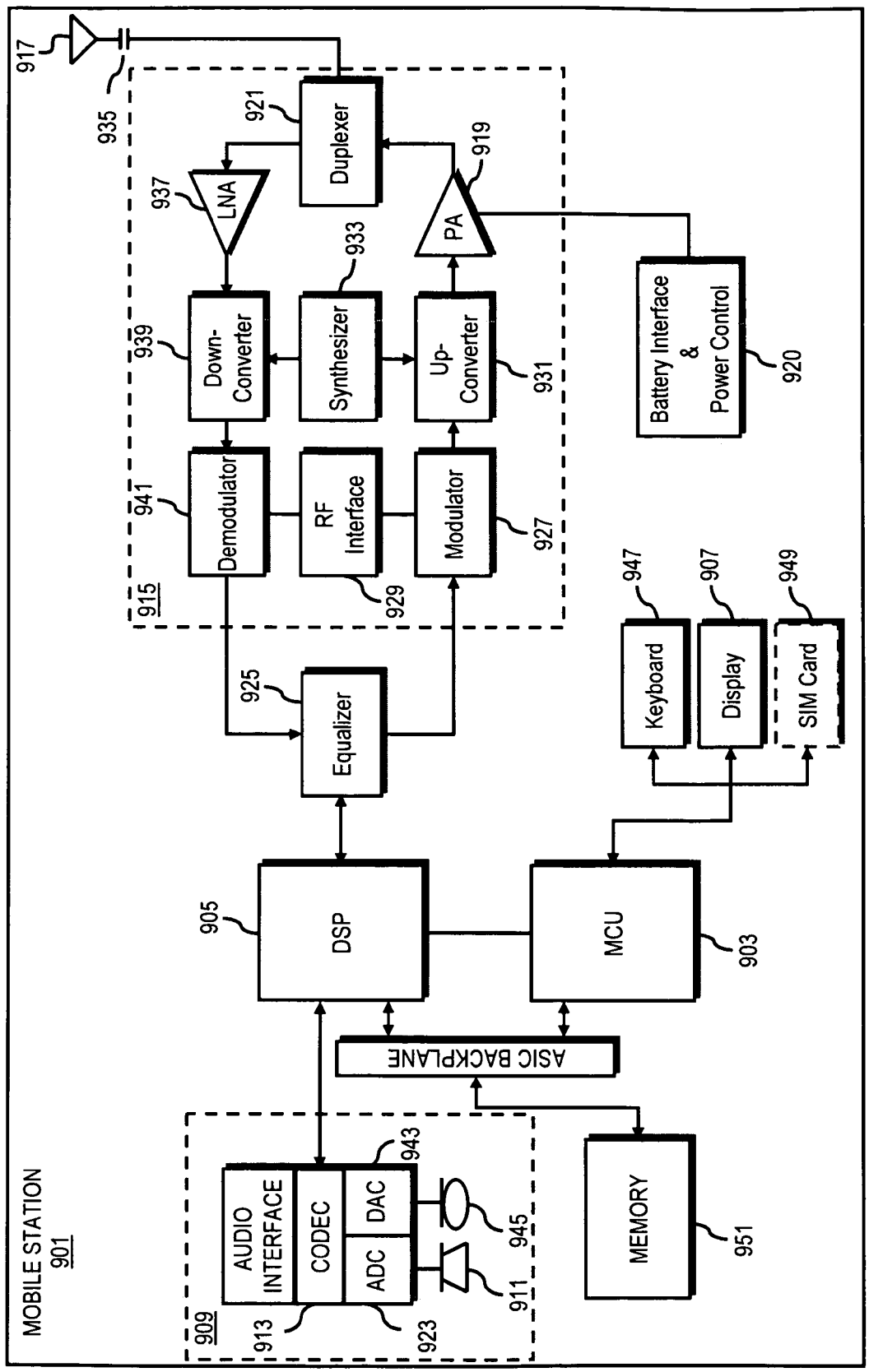
FIG. 9 is a diagram of a mobile station (e.g., handset) that can be used to implement an embodiment of the invention.

FIG. 9 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 for shared scalable caching of mobile application data. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, at an application agnostic index service, a first request message from a first service requesting application data for a first application stored in a distributed database for a plurality of applications, wherein the first request includes a first parameter specifying the application data;
   causing, at least in part, a transmission of the application data to the first service from the distributed database;
   receiving, at the application agnostic index service, a second request message from a second service requesting the application data for a second application, wherein the second request includes a second parameter specifying the application data;
   causing, at least in part, a transmission of the application data to the second service from the distributed database,
   wherein the first service and the second service are unrelated;
   wherein the application data comprises a separate and distinct application for providing a function on a mobile device within the first application and the plurality of other applications;
   wherein the application data comprises a set of questions and corresponding answers for a quiz about content that can be rendered on the mobile device;
   wherein the application data further comprises instructions for execution by a processor for prompting a user to respond to a question and scoring a response; and
   performing the function comprises presenting at least one question to a particular user of a particular mobile device executing the application, and prompting the particular user to respond to the at least one question and scoring the response.

2. A method of claim 1, wherein the distributed database is configured to store the application data in association with at least one application of the plurality of applications, the distributed database being accessible by a plurality of mobile devices.

3. A method of claim 1, wherein the application agnostic index service associates the application data with a corresponding cache.

4. A method of claim 1, wherein the application data comprises metadata of content available from a content store.

5. A method of claim 1, further comprising:
   determining whether the application data is available from the application agnostic index service; and
   if the application data is not available from the application agnostic index service, causing, at least in part, storing of the application data into the distributed database in association with at least the first application.

6. An apparatus comprising:
   at least one processor; and
   at least one memory including computer program code for one or more programs, the memory and the computer program code configured to, with the processor, cause the apparatus to perform at least the following:
      receive, at an application agnostic index service, a first request message from a first service requesting application data for a first application stored in a distributed database for a plurality of applications, wherein the first request includes a first parameter specifying the application data;
      cause, at least in part, a transmission of the application data to the first service from the distributed database;
      receive, at the application agnostic index service, a second request message from a second service requesting the application data for a second application, wherein the second request includes a second parameter specifying the application data; and
      cause, at least in part, a transmission of the application data to the second service from the distributed database,
      wherein the first service and the second service are unrelated;
      wherein the application data comprises a separate and distinct application for providing a function on a mobile device within the first application and the plurality of other applications;
      wherein the application data comprises a set of questions and corresponding answers for a quiz about content that can be rendered on the mobile device;
      wherein the application data further comprises instructions for execution by a processor for prompting a user to respond to a question and scoring a response; and
      performing the function comprises presenting at least one question to a particular user of a particular mobile device executing the application, and prompting the particular user to respond to the at least one question and scoring the response.

7. An apparatus of claim 6, wherein the distributed database is configured to store the application data in association with at least one application of the plurality of applications, the distributed database being accessible by a plurality of mobile devices.

8. An apparatus of claim 6, wherein the application agnostic index service associates the application data with a corresponding cache.

9. An apparatus of claim 6, wherein the application data comprises metadata of content available from a content store.

10. An apparatus of claim 6, wherein the apparatus is further caused to:
    determine whether the application data is available from the application agnostic index service; and
    if the application data is not available from the application agnostic index service, cause, at least in part, a storing of the application data into the distributed database in association with at least the first application.

\* \* \* \* \*